US012624466B1

(12) United States Patent
Ganiyu et al.

(10) Patent No.: US 12,624,466 B1
(45) Date of Patent: May 12, 2026

(54) ELECTROCATALYTIC METHOD FOR HYDROGEN PRODUCTION

(71) Applicant: King Fahd University of Petroleum and Minerals, Dhahran (SA)

(72) Inventors: Saheed Ganiyu, Dhahran (SA); Esraa Ragab Abas Kotob, Dhahran (SA); Khalid Alhooshani, Dhahran (SA); Ijaz Hussain, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/233,988

(22) Filed: Jun. 10, 2025

(51) Int. Cl.

| | |
|---|---|
| *C25B 11/061* | (2021.01) |
| *B01J 23/89* | (2006.01) |
| *C25B 1/01* | (2021.01) |
| *C25B 1/02* | (2006.01) |
| *C25B 11/04* | (2021.01) |
| *C25B 11/067* | (2021.01) |
| *C25B 11/081* | (2021.01) |
| *B01J 35/45* | (2024.01) |
| *C25B 11/093* | (2021.01) |
| *H01M 4/86* | (2006.01) |

(Continued)

(52) U.S. Cl.
CPC ......... *C25B 11/061* (2021.01); *B01J 23/8926* (2013.01); *C25B 1/01* (2021.01); *C25B 1/02* (2013.01); *C25B 11/04* (2013.01); *C25B 11/067* (2021.01); *C25B 11/081* (2021.01); *B01J 35/45* (2024.01); *C25B 11/093* (2021.01); *H01M 4/86* (2013.01); *H01M 2004/8689* (2013.01); *H01M 4/921* (2013.01); *H01M 8/222* (2013.01)

(58) Field of Classification Search
CPC   C25B 1/02; C25B 1/04; C25B 11/061; C25B 11/067; C25B 11/081; C25B 11/093; B01J 35/45
USPC ................................. 204/293; 205/638, 639
See application file for complete search history.

(56) References Cited

U.S. PATENT DOCUMENTS

2022/0298657 A1     9/2022   Shinde et al.

FOREIGN PATENT DOCUMENTS

| CN | 111841642 B | 2/2021 |
|---|---|---|
| CN | 113981483 A | 1/2022 |
| CN | 114100652 A | 3/2022 |

(Continued)

OTHER PUBLICATIONS

Liu et al. "Determination of Electrode Sheet Resistance in Cathode Catalyst Layer by AC Impedance" 2007 ECS Trans. 11 473 (Year: 2007).*

(Continued)

*Primary Examiner* — Luan V Van
*Assistant Examiner* — Alexander R. Parent
(74) *Attorney, Agent, or Firm* — Oblon, McClelland, Maier & Neustadt, L.L.P.

(57) ABSTRACT

A method of producing hydrogen by an electrochemical ammonia oxidation reaction (AOR) includes disposing an anode and a cathode in an aqueous electrolyte solution including dissolved ammonia and potassium hydroxide, and applying a potential difference between the anode and the cathode. The anode includes, based on the weight of the anode from about 98.0 percent by weight (wt. %) to about 99.5 wt. % of a polycrystalline matrix including copper hydroxide and from about 0.5 wt. % to about 2.0 wt. % of nanoparticles of crystalline platinum (Pt) dispersed in the polycrystalline matrix.

3 Claims, 11 Drawing Sheets

(51) Int. Cl.
    *H01M 4/92*          (2006.01)
    *H01M 8/22*          (2006.01)

(56)                    References Cited

FOREIGN PATENT DOCUMENTS

CN          114032579  B       7/2023
CN          117884145  A   *   4/2024   ........... C25B 11/061

OTHER PUBLICATIONS

Furrer et al. ASM Handbook, vol. 22A—Fundamentals of Modeling for Metals Processing—46. Periodic Table of Elements 2009 (pp. 585) ASM International (Year: 2009).*

Theivasanthi et al. "X-Ray Diffraction Studies of Copper Nanopowder" 2010 doi.org/10.48550/arXiv.1003.6068 (Year: 2010).*

Hosseini et al. "Preparation of electro-spun CuO nanoparticle and its application for hydrazine hydrate electro-oxidation" Electrochimica Acta 189 (2016) 45-53 (Year: 2016).*

Naveen et al. "Dual performing copper-platinum core-shell nanozyme for environmental electrochemistry-electrocatalytic oxidation and electroanalysis of ammoniat." Environ. Sci.: Nano, 2021, 8, 3603 (Year: 2021).*

Rahardjo et al. "Electrocatalytic Ammonia Oxidation Mediated by Nickel and Copper Crystallites Decorated with Platinum Nanoparticle (PtM/G, M=Cu, Ni)." ACS Sustainable Chem. Eng. 2022, 10, 5043-5054 (Year: 2022).*

Baranova et al. "Unveiling the particle size effect and surface reactivity of Pt/C nanoparticles for ammonia electrooxidation using in situ infrared spectroscopyt" Ind. Chem. Mater., 2023, 1, 542 (Year: 2023).*

Babar et al. "Recent Advances in Ammonia Electrolysis for Sustainable Hydrogen Generation." ACS Sustainable Chem. Eng. 2024, 12, 13030-13047) (Year: 2024).*

Tsai et al. "Tuning Cu2O morphologies of Cu2O/Ni foam electrodes for the control of reactivity and nitrogen selectivity in direct ammonia electrooxidation reaction" Journal of Environmental Chemical Engineering 12 (2024) 112339 (Year: 2024).*

Zhang et al. "Engineering Pt single atom catalysts on titania nanotubes via the photo/electrochemical pathway for a selective ammonia oxidation reaction." Applied Surface Science 685 (2025) 162049 (Year: 2025).*

Xuan Jiang, et al., "Identification of the role of Cu site in Ni—Cu hydroxide for robust and high selective electrochemical ammonia oxidation to nitrite", Electrochimica Acta, vol. 345, Apr. 2, 2020, 136157, Excerpts only, 6 pages.

* cited by examiner

ELECTROCATALYTIC METHOD FOR HYDROGEN PRODUCTION

BACKGROUND

Technical Field

The present disclosure relates to the field of electrochemical energy conversion and electrocatalysis and more particularly, pertains to a method for producing hydrogen via electrochemical ammonia oxidation.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

The need for plentiful energy has led to the looming depletion of fossil fuel reserves and energy security concerns caused by rapid population growth and technological advancement. Environmental challenges include global warming-induced phenomena such as rising sea levels and extreme climatic events. In response to the aforementioned exigencies, the global community has established multiple policy targets. The Paris Agreement, adopted at COP21 on Dec. 12, 2015, aims to cap the rise in global mean temperatures to below 2° C. and pursue efforts to restrict it to 1.5° C. above pre-industrial levels. The European Green Deal has committed the EU to net-zero greenhouse gas emissions by 2050, while similar declarations have been made by China (by 2060, Japan and Korea (by 2050), and India (by 2070).

In view of these climate imperatives, considerable global efforts have been channelled toward the development of clean, efficient, and renewable energy technologies. Hydrogen has emerged as a potent candidate in future energy infrastructure due to high energy density, abundance, and environmentally benign combustion profile. However, the widespread adoption of hydrogen is hampered by significant technical obstacles, particularly in storage and transport. Hydrogen has inherently low volumetric energy density and high diffusivity, which makes hydrogen prone to leakage, flammability hazards, and elevated compression or liquefaction energy requirements [See: Li Y, Li X, Pillai H S, Lattimer J, Mohd Adli N, Karakalos S, and coworkers. *Ternary PtIrNi catalysts for efficient electrochemical ammonia oxidation, ACS Catal* 2020; 10:3945-57]. The aforementioned issues have collectively impeded large-scale industrial application of hydrogen and raised the need for a viable hydrogen carrier.

Among the alternatives investigated, ammonia ($NH_3$) has attracted significant interest due to its favourable thermophysical properties and hydrogen content. As a hydrogen-rich chemical, ammonia possesses an energy density of approximately 3000 Wh $kg^{-1}$ and a hydrogen content of about 17.7 wt. % (120 g $L^{-1}$), surpassing that of methanol, synthesis gas, and other hydrogen-containing compounds [See: Lan R, Irvine J T S, Tao S. *Ammonia and related chemicals as potential indirect hydrogen storage materials, Int J Hydrogen Energy* 2012; 37:1482-94]. Furthermore, ammonia decomposition generates only nitrogen and hydrogen, without the emission of carbon oxides ($CO_X$), facilitating clean fuel production [See: García-Bordejé E, Armenise S, Roldán L. *Toward practical application of*

$H_2$generation from ammonia decomposition guided by rational catalyst design, Catal Rev Sci Eng 2014; 56:220-37]. Ammonia is advantageous in terms of transportability, as ammonia liquefies under mild conditions (about 25° C. and about 3 atm), enabling safer and more efficient logistics [See: Wan Z, Tao Y, Shao J, Zhang Y, You H. *Ammonia as an effective hydrogen carrier and a clean fuel for solid oxide fuel cells, Energy Convers Manag* 2021; 228]. Moreover, the decomposition of ammonia produces only nitrogen and hydrogen, ensuring high selectivity and process simplicity when compared to systems involving liquid organic hydrogen carriers [See: Lee S, Kim T, Han G, Kang S, Yoo Y S, Jeon S Y, and coworkers, *Comparative energetic studies on liquid organic hydrogen carrier: A net energy analysis. Renewable and sustainable energy reviews, Renewable and Sustainable Energy Reviews* 2021; 150].

Ammonia electrolysis offers further promise as a method for hydrogen generation, producing clean hydrogen without $CO_X$ emissions and requiring less energy input than conventional water electrolysis. The anode and cathode reactions in alkaline ammonia electrolysis are represented as follows:

Anode:

$$2NH_3 + 6OH^- \rightarrow N_2 + 6H_2O + 6e^- \; E° = -0.77 \text{ V vs SHE} \tag{1}$$

Cathode:

$$6H_2O + 6e^- \rightarrow 3H_2 + 6OH^- \; E° = -0.83 \text{ V vs SHE} \tag{2}$$

Overall Reaction:

$$2NH_3 \rightarrow N_2 + 3H_2 \; E° \text{ Cell} = 0.06 \text{ V vs SHE} \tag{3}$$

As demonstrated by equations (1)-(3), ammonia electrolysis operates at a thermodynamic cell voltage of just 0.06 V, significantly lower than the 1.23 V required for water splitting [See: Palaniappan R, Botte G G. *Effect of ammonia on Pt, Ru, Rh, and Ni cathodes during the alkaline hydrogen evolution reaction, Journal of Physical Chemistry C* 2013; 117:17429-41]. This implies a theoretical energy consumption of 1.55 Wh $g^{-1}$ $H_2$ approximately 95% less than that of water electrolysis, highlighting ammonia electrolysis as a potentially energy-efficient alternative [See: Vitse F, Cooper M, Botte G G. *On the use of ammonia electrolysis for hydrogen production* and Zhang H, Wang Y, Wu Z, Leung D Y C. *An ammonia electrolytic cell with NiCu/C as anode catalyst for hydrogen production, J Power Sources* 2005; 142:18-26].

Despite the theoretical advantages, the practical deployment of ammonia electrolysis faces key limitations, primarily attributed to the sluggish kinetics and substantial overpotential of the ammonia oxidation reaction (AOR) at the anode. The factors hinder the rate and efficiency of hydrogen generation from ammonia. In order to mitigate the aforementioned kinetic barriers, considerable efforts have been made to design and develop high-performance electrocatalysts capable of promoting the AOR.

Noble metals such as platinum (Pt), ruthenium (Ru), and iridium (Ir) have demonstrated excellent catalytic performance in this context [See: Shih Y J, Huang Y H, Huang C P. *Electrocatalytic ammonia oxidation over a nickel foam electrode: Role of Ni(OH)$_2$(s)-NiOOH(s) nanocatalysts* and Shih Y J. Huang Y H, Huang C P. *Electrocatalytic ammonia oxidation over a nickel foam electrode: Role of Ni(OH)$_2$(s)-NiOOH(s) nanocatalysts Electrochim Acta* 2018; 263:261-71. doi.org/10.1016/j.electacta.2018.01.045]. Among these, Pt and bimetallic derivatives thereof particularly Pt—Ru and Pt—Ir have shown desirable electrochemical activity. However, these catalysts are prohibitively expensive and suffer from surface poisoning caused by the adsorption of reaction intermediates, which leads to catalyst deactivation and performance degradation. The foregoing drawbacks pose serious challenges to the commercial viability of noble metal-based catalysts.

In accordance with aforementioned challenge, alternative catalyst systems using base metals have been explored. Nickel and nickel-oxide-based materials have been proposed for AOR and hydrogen evolution applications, offering a lower-cost option with moderate performance. However, the nickel-oxide-based materials suffer from corrosion and instability in ammonia-rich alkaline electrolytes, resulting in short operational lifespans. Copper, which theoretically exhibits AOR activity comparable to platinum, has also been investigated. Nonetheless, due to weak nitrogen binding, copper demonstrates low catalytic efficiency for AOR under experimental conditions [See: Herron J A, Ferrin P, Mavrikakis M. *Electrocatalytic Oxidation of ammonia on transition-metal surfaces Journal of Physical Chemistry C* 2015; 119:14692-701].

Given the limitations associated with both noble metal and non-noble metal systems, there arises a requirement for the development of an electrocatalyst that may deliver high AOR activity, low overpotential, resistance to deactivation, and cost-effectiveness for long-term ammonia electrolysis. Accordingly, one object of the present disclosure is to provide a method of producing hydrogen by an electrochemical ammonia oxidation, that may circumvent the above specified drawbacks and limitation of the methods known in the art.

SUMMARY

In an exemplary embodiment, a method of producing hydrogen by an electrochemical ammonia oxidation reaction (AOR) is described. The method includes disposing an anode and a cathode in an aqueous electrolyte solution including dissolved ammonia and potassium hydroxide, and applying a potential difference between the anode and the cathode. The anode includes, based on the weight of the anode from about 98.0 percent by weight (wt. %) to about 99.5 wt. % of a polycrystalline matrix including copper hydroxide and from about 0.5 wt. % to about 2.0 wt. % of nanoparticles of crystalline platinum (Pt) dispersed in the polycrystalline matrix.

In some embodiments, the polycrystalline matrix includes single atom Pt.

In some embodiments, the anode includes, based on the weight of the anode from about 98.5 to about 99.5 wt. % of a polycrystalline matrix including copper hydroxide, and from about 0.5 to about 1.5 wt. % of nanoparticles of crystalline platinum (Pt) dispersed in the polycrystalline matrix.

In some embodiments, the matrix includes substantially spherical aggregates of nanoparticles of copper hydroxide.

In some embodiments, the aggregates have a mean grain size, as determined by high resolution transmission electron microscopy (HRTEM), from about 50 nanometers (nm) to about 100 nm.

In some embodiments, the polycrystalline matrix further includes nanocrystals of elemental copper (Cu).

In some embodiments, the elemental copper has a face-centered cubic crystalline structure.

In some embodiments, the polycrystalline matrix further includes substantially spherical aggregates of elemental Cu nanoparticles.

In some embodiments, a fraction of the elemental copper (Cu) nanoparticles have a particle size less than about 10 nm, as determined by transmission electron microscopy (TEM).

In some embodiments, the nanoparticles of crystalline platinum (Pt) have a mean grain size, as determined by HRTEM, of from about 0.5 to about 5 nm.

In some embodiments, the nanoparticles of crystalline platinum (Pt) have a mean grain size, as determined by HRTEM, of from about 0.5 to about 3 nm In some embodiments, the platinum (Pt) has a face-centered cubic crystalline structure, as determined by X-ray diffraction (XRD).

In some embodiments, the anode has a sheet resistance of greater than about 15 ohms per square centimeter ($\Omega cm^{-2}$), as determined by electrochemical impedance spectroscopy (EIS).

In some embodiments, the anode is super-capacitive.

In some embodiments, the anode is obtained by the following steps performed under an inert atmosphere. The steps include dissolving a copper (II) salt and a water-soluble polymer in water to form a first solution, adding a first reducing agent to the first solution to form a second solution. The first reducing agent is selected from the group consisting of hydroxy-carboxylic acids and reactive derivatives thereof. Further, adding a second reducing agent to the second solution under agitation at a temperature of from about 30 to about 90° C. to form a third mixture, where the second reducing agent is selected from the group consisting of: lithium borohydride (LiBH$_4$), sodium borohydride (NaBH$_4$), potassium borohydride (KBH$_4$), and ammonium borohydride (NH$_4$BH$_4$). Furthermore, separating the obtained solid from the third mixture, mixing an aqueous base and a platinum (Pt) precursor with the obtained solid to form a fourth mixture and agitating that fourth mixture at a temperature of from about 10 to about 80° C. for a duration of from 1 to 10 hours, separating the obtained anodic material from the fourth mixture; and, casting the anodic material to form the anode.

In some embodiments, the copper salt is selected from the group consisting of copper (II) sulfate (CuSO$_4$), copper (II) nitrate (Cu(NO$_3$)$_2$, copper (II) chloride (CuCl$_2$) and copper (II) acetate (Cu(CH$_3$COO)$_2$).

In some embodiments, the water-soluble polymer includes polyvinylpyrrolidone.

In some embodiments, the hydroxy carboxylic acid is selected from the group consisting of lactic acid, malic acid, tartaric acid, glycolic acid, citric acid, and ascorbic acid.

In some embodiments, the platinum precursor is selected from the group consisting of PtCl$_3$; dihydrogen hexachloroplatinate (IV) hydrate, platinum nitrates, platinum dinitrodiammine salts, platinum tetraammine salts, platinum hexaammine salts, platinum bisethanolamine salts, platinum bisacetylacetonate salts, platinum carbonates, platinum hydroxides, and platinum oxides.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figures 1A, 1B:
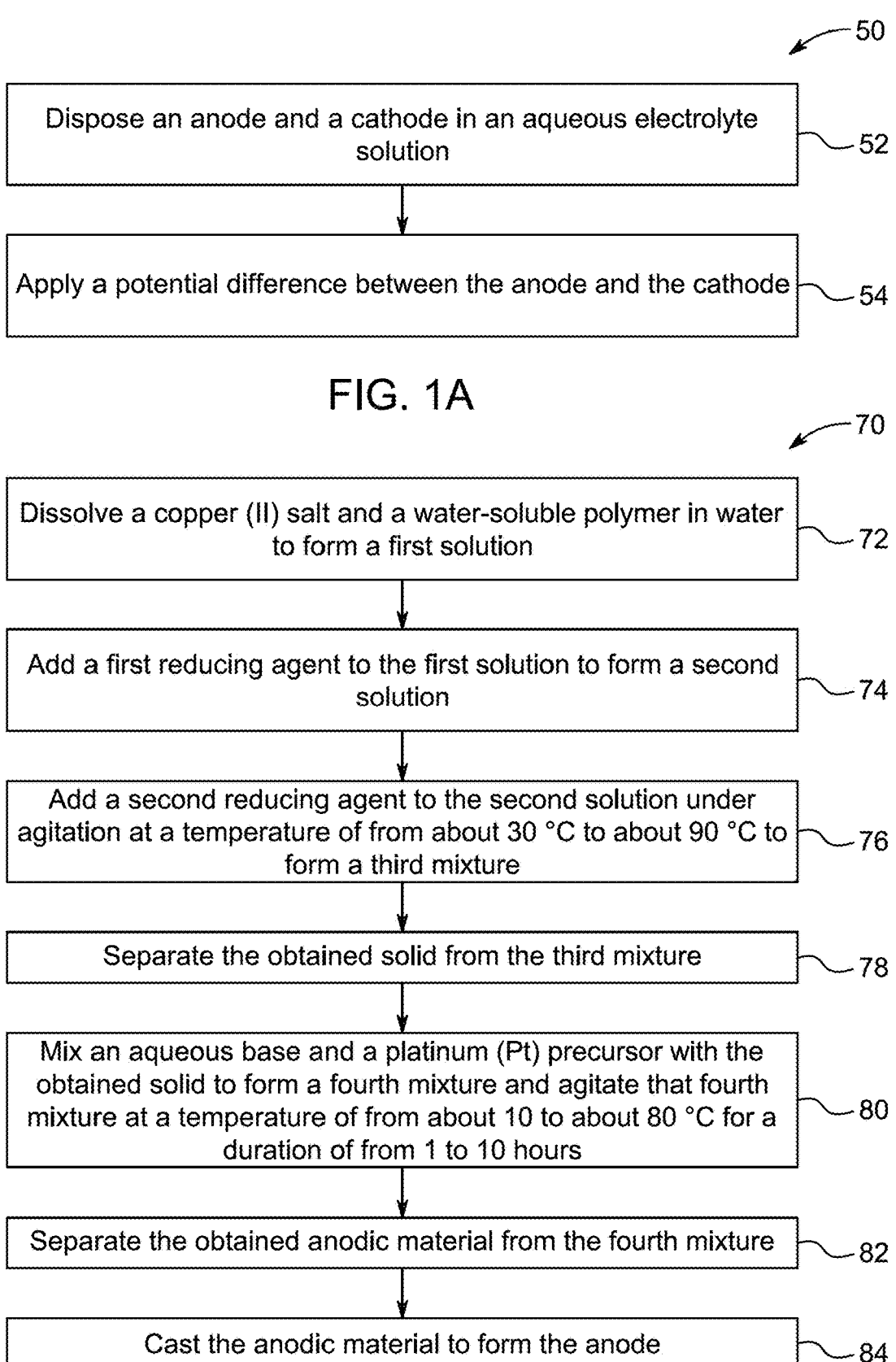
FIG. 1A illustrates an exemplary flow chart for a method of producing hydrogen by an electrochemical ammonia oxidation reaction, according to certain embodiments.
FIG. 1B illustrates an exemplary flow chart for a method of forming an anode under an inert atmosphere, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, reference numerals designate identical or corresponding parts throughout several views. Further, as used herein, the words 'a', 'an' and the like generally carry a meaning of 'one or more,' unless stated otherwise.

Furthermore, the terms 'approximately', 'approximate', 'about', and similar terms generally refer to ranges that include the identified value within a margin of 20%, 10%, or preferably 5%, and any values therebetween.

As used herein, the term 'room temperature' refers to a temperature range of '25 degrees Celsius (° C.)$\pm$3° C. in the present disclosure.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}$C and $^{14}$C. Isotopes of oxygen include $^{16}$O, $^{17}$P, and $^{18}$O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'ammonia electrolysis' refers to an electrochemical process that decomposes ammonia (NH$_3$) into nitrogen gas and/or hydrogen gas through the application of electrical energy.

As used herein, the term 'ammonia oxidation reaction (AOR)' refers to the anodic half-reaction in ammonia electrolysis where ammonia is oxidized to produce nitrogen, protons, and electrons.

As used herein, the term 'anode' refers to the electrode at which oxidation occurs in an electrochemical cell.

As used herein, the term 'cathode' refers to the electrode at which reduction occurs in an electrochemical cell.

As used herein, the term 'aqueous electrolyte solution' refers to a liquid medium composed of water and dissolved ionic compounds that enable ionic conductivity in electrochemical systems.

As used herein, the term 'polycrystalline matrix' refers to a solid structure composed of multiple small crystals or grains of varying orientation joined together, preferably in a homogeneous mass.

As used herein, the term 'face-centred cubic crystalline structure' refers to a type of crystal lattice in which atoms are positioned at each corner and the centre of all cube faces of the unit cell.

As used herein, the term 'sheet resistance' refers to the resistance to electric current flow within a thin film of uniform thickness, typically measured in ohms per square.

As used herein, the term 'electrochemical impedance spectroscopy (EIS)' refers to a technique used to measure the frequency-dependent response of an electrochemical system to an applied alternating current.

As used herein, the term 'super-capacitive' refers to having characteristics associated with high-capacity, fast-charging electrochemical capacitors, such as high-power density and rapid charge-discharge cycles.

As used herein, the term 'polymer' refers to a substance composed of large molecules made up of repeating structural units (monomers) bonded together.

As used herein, the term 'water-soluble polymer' refers to a polymer that can dissolve in water, forming a homogeneous solution.

As used herein, the term 'reducing agent' refers to a chemical species that donates electrons to another species in a redox reaction, thereby becoming oxidized.

Aspects of the present disclosure are directed to a system and method for enhancing hydrogen production through ammonia electrolysis. In the present disclosure, a catalyst is synthesized using a wet chemical technique to improve the efficiency of the ammonia oxidation reaction (AOR), a known challenge in ammonia electrolysis. The present disclosure incorporates a strategic combination of materials, where the integration of platinum into a copper hydroxide matrix enhances the overall catalytic activity due to platinum's favourable properties in hydrogen evolution reactions. The synergistic and structural interactions between the materials are explored to gain a deeper understanding of AOR mechanisms. This approach highlights the potential for designing efficient and cost-effective electrocatalysts using metal and metal oxide alloy systems for sustainable ammonia-to-hydrogen energy conversion.

FIG. 1A illustrates a flow chart of a method 50 of producing hydrogen by an electrochemical ammonia oxidation reaction. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes disposing an anode and a cathode in an aqueous electrolyte solution. The aqueous electrolyte solution may include water and a base. The base selected from the group consisting of an alkaline earth metal hydroxide such as beryllium hydroxide ($Be(OH)_2$), magnesium hydroxide ($Mg(OH)_2$), strontium hydroxide ($Sr(OH)_2$), and calcium hydroxide ($Ca(OH)_2$) and an alkali metal hydroxide such as lithium hydroxide (LiOH), sodium hydroxide (NaOH), potassium hydroxide (KOH) and rubidium hydroxide (RbOH), and cesium hydroxide (CsOH). In a preferred embodiment, the aqueous electrolyte solution includes dissolved ammonia and potassium hydroxide.

The anode includes, based on the weight of the anode, includes about 98.0 to about 99.5 wt. % of a polycrystalline matrix including copper hydroxide; and from about 0.5 to about 2.0 wt. % of nanoparticles of crystalline platinum (Pt) dispersed in the polycrystalline matrix. In a specific embodiment, the anode includes, based on the weight of the anode includes about 98.5 to about 99.5 wt. % of a polycrystalline matrix including copper hydroxide; and from about 0.5 to about 1.5 wt. % of nanoparticles of crystalline platinum (Pt) dispersed in the polycrystalline matrix.

In some embodiments, the nanoparticles of crystalline platinum (Pt) have a mean grain size, as determined by high resolution transmission electron microscopy, of from about 0.5 to about 5 nanometers (nm), preferably 0.6 nm, preferably 0.7 nm, preferably 0.8 nm, preferably 0.9 nm, preferably 1 nm, preferably 1.1 nm, preferably 1.2 nm, preferably 1.3 nm, preferably 1.4 nm, preferably 1.5 nm, preferably 1.6 nm, preferably 1.7 nm, preferably 1.8 nm, preferably 1.9 nm, preferably 2 nm, preferably 2.1 nm, preferably 2.2 nm, preferably 2.3 nm, preferably 2.4 nm, preferably 2.5 nm, preferably 2.6 nm, preferably 2.7 nm, preferably 2.8 nm, preferably 2.9 nm; preferably 0.5 to about 3 nm, preferably 1 to 2 nm.

In some embodiments, the polycrystalline matrix includes single atom Pt, which may enhance catalytic activity due to its high surface-to-volume ratio and maximized atomic efficiency. The platinum (Pt) has a face-centered cubic crystalline structure, as determined by X-Ray Diffraction (XRD).

In some embodiments, the polycrystalline matrix includes substantially spherical aggregates of nanoparticles of copper hydroxide, providing a high surface area and improved electron transport pathways, thereby promoting efficient electrochemical performance. In some embodiments, the nanoparticles of copper hydroxide may exist in various morphological shapes, such as nanosheets, nanorods, nanospheres, nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, hierarchical flower-like structures, needle-like structures, porous networks, and dendritic structures etc. and mixtures thereof. The aggregates have a mean grain size, as determined by High Resolution Transmission Electron Microscopy (HRTEM), of from about 50 nm, preferably 51 nm, preferably 52 nm, preferably 53 nm, preferably 54 nm, preferably 55 nm, preferably 56 nm, preferably 57 nm, preferably 58 nm, preferably 59 nm, preferably 60 nm, preferably 61 nm, preferably 62 nm, preferably 63 nm, preferably 64 nm, preferably 65 nm, preferably 66 nm, preferably 67 nm, preferably 68 nm, preferably 69 nm, preferably 70 nm, preferably 70 nm, preferably 71 nm, preferably 72 nm, preferably 73 nm, preferably 74 nm, preferably 75 nm, preferably 76 nm, preferably 77 nm, preferably 78 nm, preferably 79 nm, preferably 80 nm, preferably 81 nm, preferably 82 nm, preferably 83 nm, preferably 84 nm, preferably 85 nm, preferably 86 nm, preferably 87 nm, preferably 88 nm, preferably 89 nm, preferably 90 nm, preferably 91 nm, preferably 92 nm, preferably 93 nm, preferably 94 nm, preferably 95 nm, preferably 96 nm, preferably 97 nm, preferably 98 nm, preferably 99 nm. The aggregates have a mean grain size, as determined by HRTEM, about 50 to about 100 nm, preferably 60 to about 80 nm, preferably 70 nm.

In some embodiments, the polycrystalline matrix further includes nanocrystals of elemental copper (Cu). The elemental copper has a face-centered cubic crystalline structure. In some embodiments, the elemental copper may have other crystallinity such as body-centered cubic (BCC), hexagonal close-packed (HCP), amorphous copper, and alloyed phases (e.g., in brass or bronze).

In some embodiments, the polycrystalline matrix further includes substantially spherical aggregates of elemental copper (Cu) nanoparticles, enhances electrical and thermal conductivity. In some embodiments, at least a fraction of the elemental copper (Cu) nanoparticles have a particle size less than about 10 nm, preferably 5 nm, preferably 6 nm, preferably 7 nm, preferably 8 nm, as determined by Transmission Electron Microscopy (TEM).

At step 54, the method 50 includes applying a potential difference between the anode and the cathode.

FIG. 1B illustrates a flow chart of a method 70 of forming the anode under an inert atmosphere. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes dissolving a copper (II) salt and a water-soluble polymer in water to form a first solution. The copper salt is selected from the group of copper (II) sulfate ($CuSO_4$), copper (II) nitrate ($Cu(NO_3)_2$), copper (II) chloride ($CuCl_2$) and copper (II) acetate (Cu($CH_3COO)_2$). The water-soluble polymer includes polyvinylpyrrolidone. Alternative examples of copper (II) salts may include copper (II) bromide, copper (II) iodide, copper (II) carbonate, copper (II) oxide, copper (II) thiocyanate, copper (II) perchlorate, copper (II) formate, copper (II) sulfamate, and copper (II) acetate monohydrate. For water-soluble polymers, alternatives to polyvinylpyrrolidone (PVP) may include polyethylene glycol, polyvinyl alcohol, polyacrylic acid, polyethyleneimine, carboxymethylcellulose, poly(N-vinylcaprolactam), hydroxypropyl cellulose, poly(2-hydroxyethyl methacrylate), and polysaccharides such as chitosan and xanthan gum.

At step 74, the method 70 includes adding a first reducing agent to the first solution to form a second solution. The first reducing agent is selected from the group of hydroxy-carboxylic acids and reactive derivatives thereof. The hydroxy-carboxylic acid is selected from the group consisting of lactic acid; malic acid; tartaric acid; glycolic acid; citric acid; and, ascorbic acid. Other examples of the first reducing agents, other than hydroxy-carboxylic acids and their reactive derivatives, may include hydrazine, sodium borohydride, borane, hydroquinone, formic acid, sodium dithionite, ammonium formate, ascorbate salts (such as sodium ascorbate), glucose, fructose, sodium metal, thiourea, phenylhydrazine, and metallic iron.

At step 76, the method 70 includes adding a second reducing agent to the second solution under agitation at a temperature of from about 30° C., preferably about 31° C., preferably about 32° C., preferably about 33° C., preferably about 34° C., preferably about 35° C., preferably about 36° C., preferably about 37° C., preferably about 38° C., preferably about 39° C., preferably about 40° C., preferably about 41° C., preferably about 42° C., preferably about 43° C., preferably about 44° C., preferably about 45° C., preferably about 46° C., preferably about 47° C., preferably about 48° C., preferably about 49° C., preferably about 50° C., preferably about 51° C., preferably about 52° C., preferably about 53° C., preferably about 54° C., preferably about 55° C., preferably about 56° C., preferably about 57° C., preferably about 58° C., preferably about 59° C., preferably about 60° C., preferably about 61° C., preferably about 62° C., preferably about 63° C., preferably about 64° C., preferably about 65° C., preferably about 66° C., preferably about 67° C., preferably about 68° C., preferably about 69° C., preferably about 70° C., preferably about 71° C., preferably about 72° C., preferably about 73° C., preferably about 74° C., preferably about 75° C., preferably about 76° C., preferably about 77° C., preferably about 78° C., preferably about 79° C., preferably about 80° C., preferably about 81° C., preferably about 82° C., preferably about 83° C., preferably about 84° C., preferably about 85° C., preferably about 86° C., preferably about 87° C., preferably about 88° C., preferably about 89° C. to form a third mixture. The step 76, the method 70 includes adding a second reducing agent to the second solution under agitation at a temperature of from about 30° C. to about 90° C., preferably 70° C. to form a third mixture. The second reducing agent is selected from the group consisting of: lithium borohydride ($LiBH_4$); sodium borohydride ($NaBH_4$); potassium borohydride ($KBH_4$); and ammonium borohydride ($NH_4BH_4$). Other examples of the second reducing agents, may include, but are not limited to, diborane, borane-tetrahydrofuran complex, calcium hydride, sodium hydride, magnesium hydride, aluminum hydride, zinc borohydride, sodium cyanoborohydride, dibutyltin hydride, tetrahydroborate salts, silicon hydrides, and tin (II) chloride.

At step 78, the method 70 includes separating the obtained solid from the third mixture. The methods such as filtration, centrifugation, decantation, sedimentation, magnetic separation, membrane separation, and drying may be used for separating the obtained solid from the third mixture. In a preferred embodiment, centrifugation is used to separate the obtained solid from the third mixture. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min.

At step 80, the method 70 includes mixing an aqueous base and a platinum (Pt) precursor with the obtained solid to form a fourth mixture and agitating that fourth mixture at a temperature of from about 10 to about 80° C. for a duration of from 1 to 10 hours, preferably 2 to 9 hours, preferably 8 hours. The aqueous base may include, but is not limited to, potassium hydroxide, calcium hydroxide, magnesium hydroxide, barium hydroxide, sodium hydroxide, lithium hydroxide, strontium hydroxide, aluminum hydroxide, iron (III) hydroxide, copper (II) hydroxide, zinc hydroxide, manganese (II) hydroxide, chromium (III) hydroxide, nickel (II) hydroxide, cobalt (II) hydroxide, ammonium hydroxide, cesium hydroxide, rubidium hydroxide, copper (I) hydroxide, lead (II) hydroxide, tin (II) hydroxide, thallium (I) hydroxide, antimony (III) hydroxide, boron hydroxide, molybdenum hydroxide, tungsten hydroxide, vanadium hydroxide, titanium hydroxide, zirconium hydroxide, tantalum hydroxide, beryllium hydroxide, silver hydroxide, gold hydroxide, mercury (II) hydroxide, gallium hydroxide, indium hydroxide, arsenic (III) hydroxide. The platinum precursor is selected from the group of: $PtCl_3$; dihydrogen hexachloroplatinate (IV) hydrate; platinum nitrates; platinum dinitrodiammine salts; platinum tetraammine salts; platinum hexaammine salts; platinum bisethanolamine salts; platinum bisacetylacetonate salts; platinum carbonates; platinum hydroxides; and, platinum oxides. In a preferred embodiment, the aqueous base is sodium hydroxide. Other examples of the platinum precursors may include, but are not limited to, platinum acetylacetonate, platinum acetates, platinum acetylacetonate chloride, platinum phosphine complexes, platinum alkoxides, platinum ammine complexes, platinum allyl complexes, platinum cyanide complexes, platinum halide complexes other than those listed, platinum carboxylates, platinum thiolate complexes, and organoplatinum complexes.

At step 82, the method 70 includes separating the obtained anodic material from the fourth mixture. In some embodiments, methods such as filtration, centrifugation, decantation, washing, extraction, magnetic separation, or precipitation may be used for separating the obtained anodic material from the fourth mixture.

At step 84, the method 70 includes casting the anodic material to form the anode. In some embodiments, physical vapor deposition (PVD), chemical vapor deposition (CVD), spin coating, dip coating, electrophoretic deposition (EPD), langmuir-blodgett (LB) technique, drop casting, sol-gel process, layer-by-layer (LbL) assembly, inkjet printing, spray coating, and ultrasonic spray deposition may be used to cast the anodic material to form the anode. In some embodiments, a syringe pump may be used for casting the anodic material to form the anode.

The anode has a sheet resistance of greater than about 15 ohm square centimeter ($\Omega cm^{-2}$), as determined by electrochemical impedance spectroscopy (EIS). The anode is super-capacitive. The anode may exhibit enhanced energy storage capacity and rapid charge-discharge capabilities. The super-capacitive properties enable the anode to provide high power density, extended cycle life, and fast charging and discharging rates. Such characteristics are beneficial in energy storage systems, including but not limited to supercapacitors, where high efficiency, long-term stability, and rapid energy transfer are critical for desired performance. The super-capacitive nature of the anode may allow for improved power delivery and energy retention during repeated cycles of charging and discharging.

EXAMPLES

The following examples demonstrate a method of producing hydrogen by an electrochemical ammonia oxidation reaction. The examples are provided solely for illustration and are not to be construed as limitations of the present disclosure, as many variations thereof are possible without departing from the spirit and scope of the present disclosure.

Example 1: Catalyst Preparation

According to the present disclosure, polycrystalline copper nanoparticles were synthesized via a wet chemical reduction method employing ascorbic acid (AA), ethylene glycol (EG), and sodium borohydride ($NaBH_4$) as reductive and stabilizing agents [See: Li Y, Li X, Pillai H S, Lattimer J, Mohd Adli N, Karakalos S, and coworkers, *Ternary PtIrNi catalysts for efficient electrochemical ammonia oxidation ACS Catal* 2020; 10:3945-57, incorporated herein by reference in its entirety]. The sodium borohydride modulated the morphological features and crystallographic phases of the copper nanoparticles and simultaneously acted as a reducing agent to inhibit the formation of copper oxides. Initially, copper (II) chloride dihydrate ($CuCl_2 \cdot 2H_2O$) was dissolved in deionized water under an argon (Ar) atmosphere. Polyvinylpyrrolidone (PVP, Mw ~40,000) was added to the aqueous solution as a stabilizer. The resulting mixture was subjected to magnetic stirring to achieve homogeneity. Separately, a solution of ascorbic acid was prepared and introduced into the above mixture to initiate the reduction process. The reaction was allowed to proceed for 30 minutes. Subsequently, an aqueous sodium ascorbate solution was added to the reaction vessel. The mixture was maintained under a continuous flow of argon for an additional 30 minutes to ensure complete reduction. Thereafter, an aqueous $NaBH_4$ solution was introduced, and the resulting suspension was stirred at 70° C. for a duration of two hours under an argon atmosphere. Upon completion of the reaction, the resulting product was isolated via centrifugation and subjected to sequential washing with deionized water and ethanol to remove residual impurities. The washed precipitate was dried under vacuum to yield copper nanoparticles. Post-synthesis, a 0.5 M sodium hydroxide (NaOH) solution was added dropwise to the dried copper product under an argon atmosphere. The suspension was stirred continuously for 8 hours to facilitate hydroxylation of the copper surface. The solid was then recovered and dried in a vacuum oven. For noble metal incorporation, a solution containing 1 wt. % platinum, derived from a $PtCl_3$ precursor, was injected into the above-prepared CuOH dispersion using a syringe pump. The suspension was subjected to constant stirring for five hours to allow for uniform metal dispersion. The final product was dried overnight in a vacuum oven to yield the CuOH—Pt catalyst.

Example 2: Chemicals

L-ascorbic acid ($C_6H_8O_6$) and polyvinylpyrrolidone (PVP) were acquired from Sigma-Aldrich. Further, ethylene glycol ($CH_2OHCH_2OH$) was procured from Sigma-Aldrich. Further, dihydrate copper chloride ($CuCl_2$), ethanol (C2H5OH), potassium chloride (KCl), sodium hydroxide (NaOH), sodium borohydride ($NaBH_4$), and $PtCl_3$ were procured from Sigma-Aldrich.

Example 3: Preparation of the Electrode

The electrochemical examination was performed utilizing a two-electrode arrangement. Platinum wire served as the counter electrode, silver/silver chloride served as the reference electrode, and an electrocatalyst that was created for use on GDL in H-cells served as the working electrode. Initially, 12.5 mg of catalyst was added to 2 mL of methanol to create the working electrode. Next, 100 microliters ($\mu L$) of Nafion was added. After that, the ink solution was sonicated for fifteen minutes. The catalyst ink was then carefully applied in an amount of 100 $\mu L$ to a one square centimeter carbon paper support, and the support was allowed to dry completely at room temperature overnight. A Nafion-117 proton exchange membrane segregated the anode and cathode compartments.

Example 4: Chemical Characterization

The morphologies and microstructures of the synthesized samples were examined using scanning electron microscopy (SEM, Zeiss Supra55) equipped with energy-dispersive X-ray spectroscopy (EDS) for elemental mapping. Transmission electron microscopy (TEM) analysis was conducted using a JEM 2100 instrument to further assess the structural features at the nanoscale. Phase identification was performed by X-ray diffraction (XRD) using a Rigaku Ultima IV diffractometer with Cu Kα radiation ($\lambda$=1.5406 Å), operated at 40 kV and 30 mA. The scanning parameters were a total acquisition time of 8 minutes, a $2\theta$ range of 10° to 90°, and a scan rate of 10° per minute.

Surface chemical composition and oxidation states of elements were analysed by X-ray photoelectron spectroscopy (XPS) using a K-Alpha spectrometer (Thermo Fisher Scientific) equipped with a mono-chromated Al Kα source (1486.6 eV). The source was operated at 6 mA and 12 kV (72 W). All binding energies were referenced to the C 1s peak at 284.8 eV.

Electrochemical measurements were carried out on a CHI-760 electrochemical workstation (Shanghai Chenhua Instrument Co. Ltd.) utilizing a standard three-electrode configuration. The working electrode included a nickel foam substrate (1×1 cm) coated with the electrocatalyst. A Hg/HgO electrode with saturated KOH served as the reference electrode, while a platinum plate was employed as the counter electrode. Cyclic voltammetry (CV) and linear sweep voltammetry (LSV) were performed within the potential window of –1.35 V to 0 V versus Hg/HgO at a scan rate of 50 mV·s$^{-1}$ in 1 M KOH containing 1 M NH$_3$·H$_2$O. All measurements were recorded after at least 30 CV cycles to ensure stabilization of the electrochemical response. Electrochemical impedance spectroscopy (EIS) was conducted using alternating current impedance measurements, where the working electrode was biased at a fixed potential, and the frequency was varied from 100 kHz to 0.01 Hz. Impedance data were analysed by nonlinear least-squares fitting using the Zview 2.0 software package.

Long-term stability tests were conducted under a constant cathodic current of either 60 mA or 100 mA for a duration of 10 hours. All polarization curves were manually iR-compensated at 85% of the ohmic resistance of the electrolyte solution. The electrochemical potentials were converted to the reversible hydrogen electrode (RHE) scale in accordance with the Nernst equation:

$$E(RHE)=E(Hg/HgO)+E^0(Hg/HgO)+0.0592\times pH,$$

where E$_{RHE}$ represents the converted potential, E(Hg/HgO) is the experimentally measured potential versus the Hg/HgO reference, and E$^0$(Hg/HgO) is the standard electrode potential of Hg/HgO at 25° C.

Figure 2A:
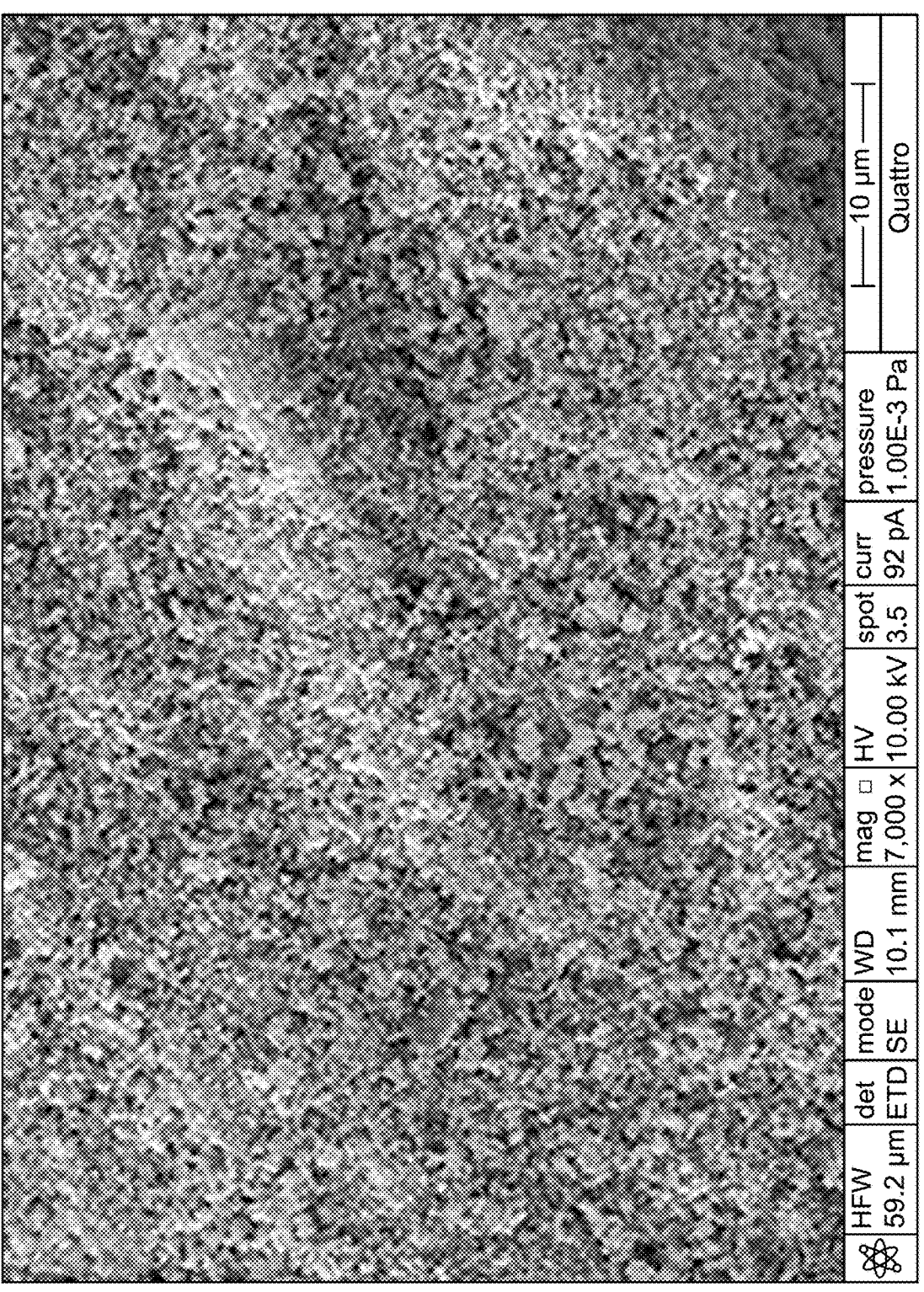
FIG. 2A illustrates a scanning electron microscopy (SEM) image of a CuOH catalyst at a magnification of 10 micrometers ($\mu$m), according to certain embodiments.
Figure 2B:
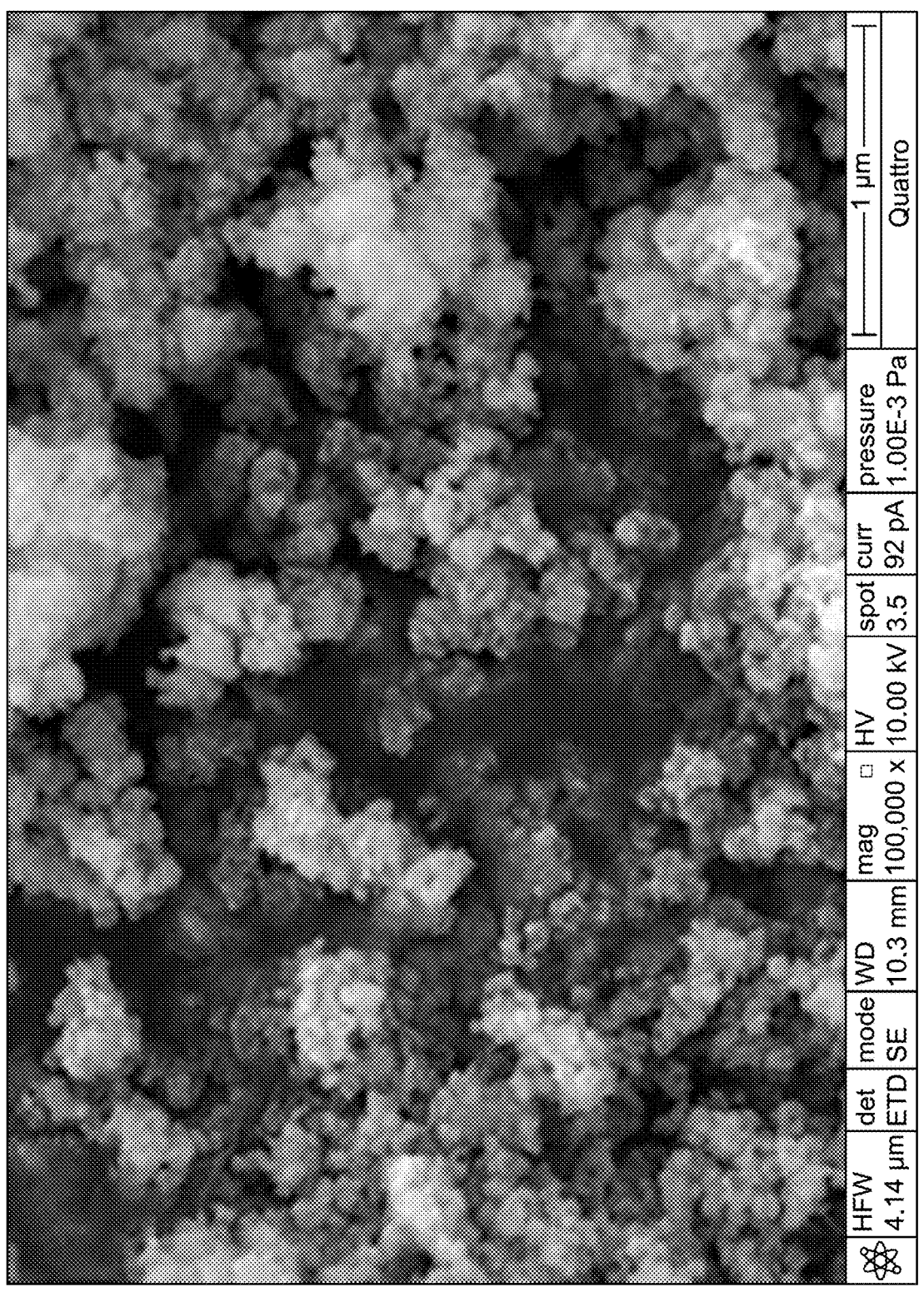
FIG. 2B depicts a SEM image of the CuOH catalyst at a magnification of 1 $\mu$m, according to certain embodiments.

The surface morphology of the synthesized CuOH and CuOH—Pt nanoparticles was examined by scanning electron microscopy (SEM). Representative SEM micrographs of the CuOH nanoparticles are provided in FIGS. 2A-2B. The CuO particles exhibit a predominantly spherical morphology with an average particle diameter in the range of 50 to 70 nm. The particles demonstrate uniform dispersion and morphological homogeneity with limited agglomeration. A minor degree of aggregation was observed, which is attributed to particle clustering occurring during the washing and drying steps [See: *Synthesis and characterization of CuO nanoparticles by the chemical liquid deposition method and investigation of its catalytic effect on the thermal decomposition of ammonium perchlorate, Cent. Eur. J. Energ. Mater.* 2017, 14(1): 152-168 incorporated herein by reference in its entirety].

Figure 2C:
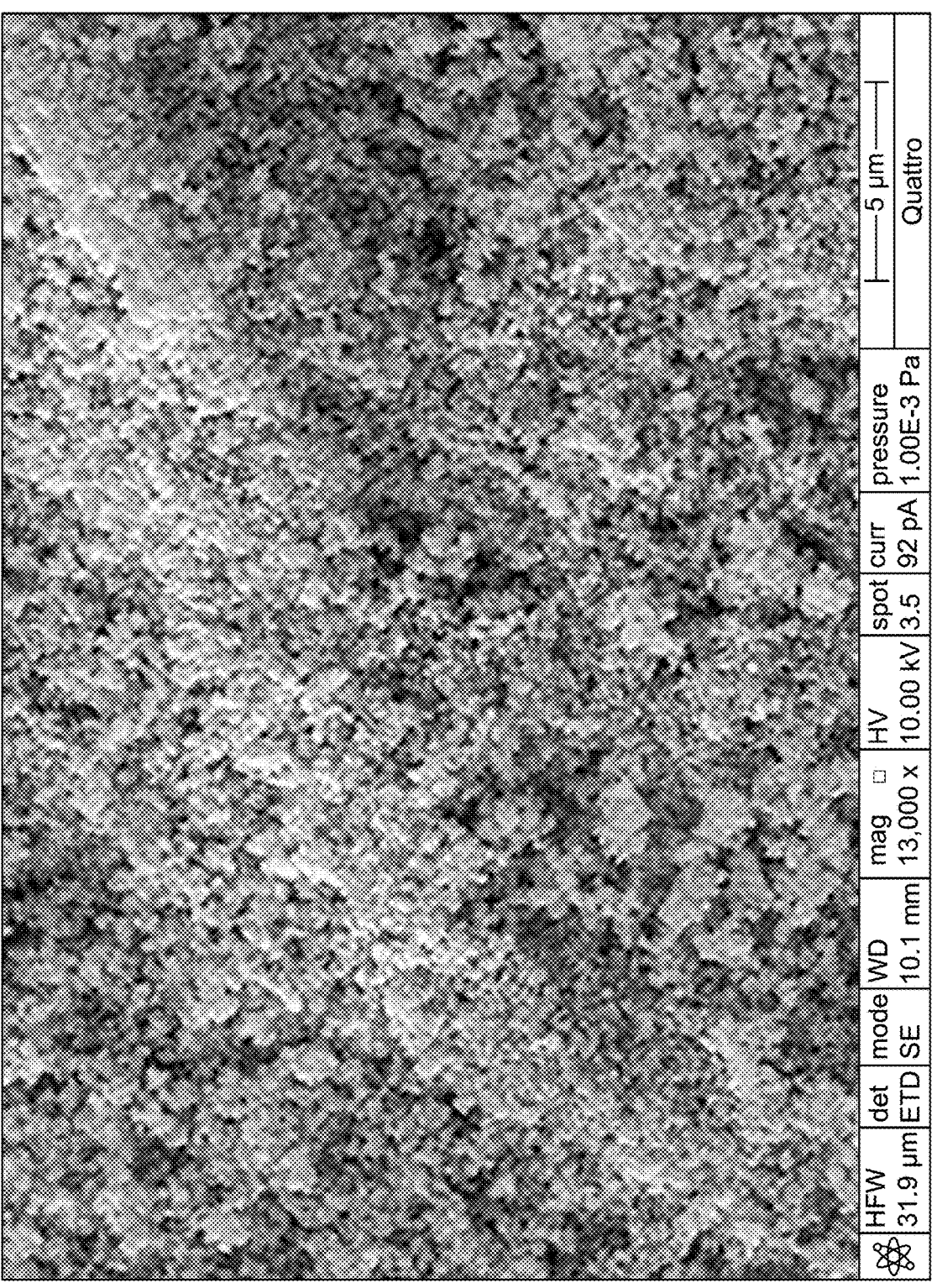
FIG. 2C illustrates a SEM image of a CuOH—Pt catalyst, at a scale of 5 $\mu$m, according to certain embodiments.
Figure 2D:
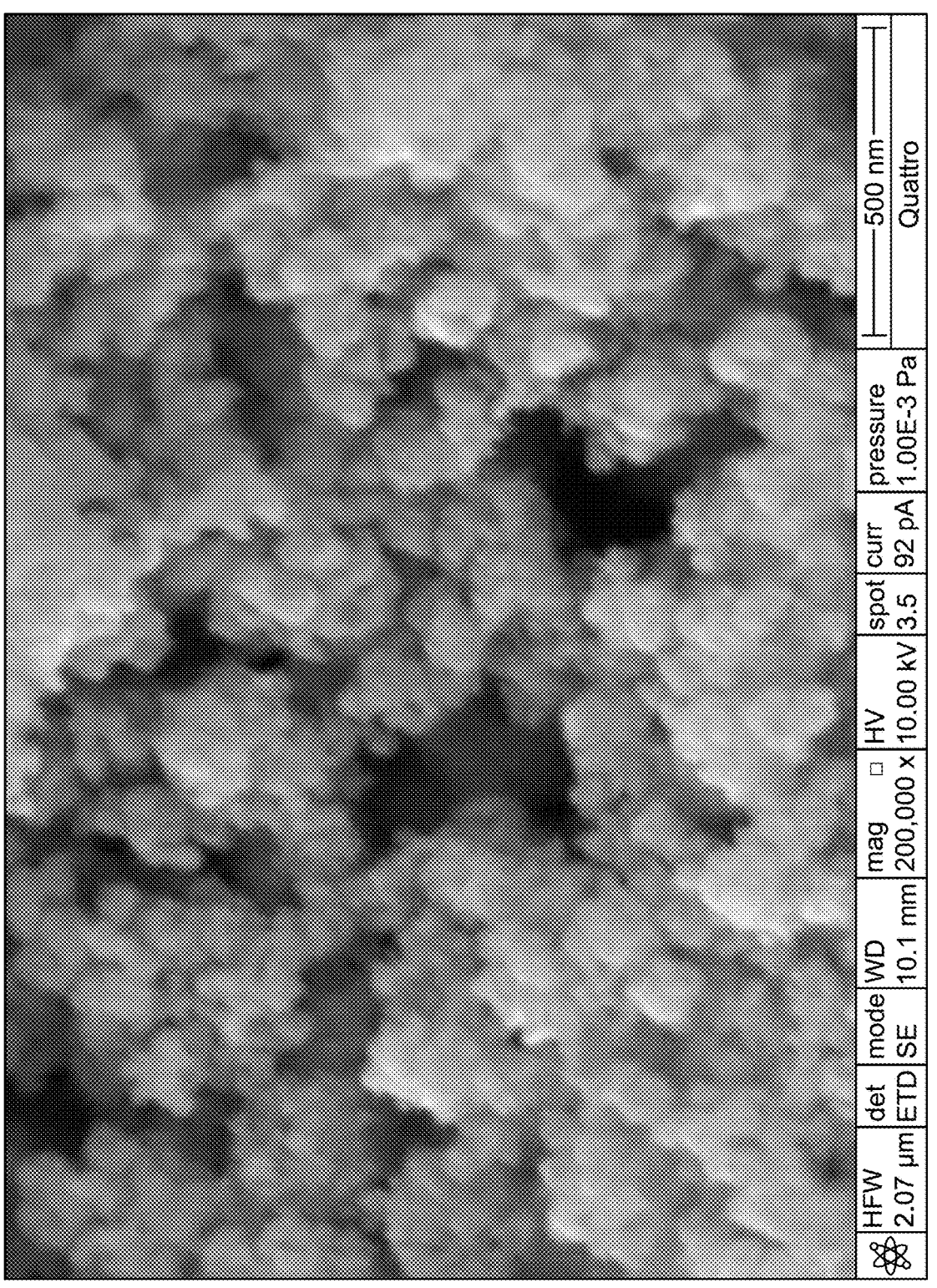
FIG. 2D illustrates a SEM image of the CuOH—Pt catalyst at a scale of 500 nanometers (nm), according to certain embodiments.

In contrast, the morphology of Cu(OH)$_2$ nanoparticles displays a flower-bud-like structure, composed of ultrathin nano walls radially oriented to form a porous, three-dimensional architecture. The observed particle dimensions lie within the range of 200 to 400 nm. Further analysis of the CuOH—Pt catalysts, shown in FIGS. 2C-2D, reveals a modified surface texture characterized by increased roughness. This is ascribed to the dispersion of fine platinum particles over the CuOH support. The CuOH—Pt samples exhibit a heterogeneous surface topography, distinct from the smoother and more uniform appearance of the unmodified CuOH samples. The observed distribution of nanoscale platinum domains across the CuOH matrix suggests a potential enhancement in surface area and active site exposure, which may contribute to improved catalytic performance under electrochemical conditions.

Figure 3A:
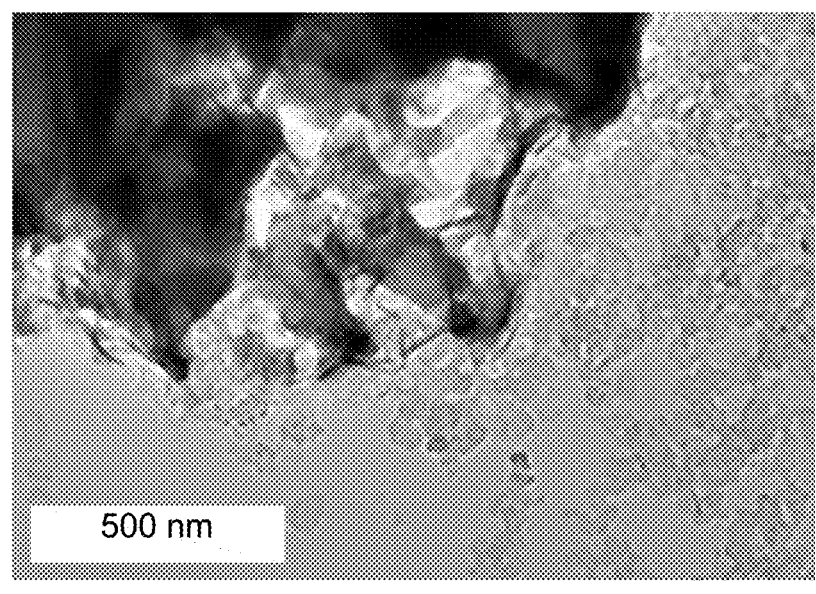
FIG. 3A illustrates a transmission electron microscopy (TEM) image of the CuOH—Pt catalyst, at a magnification of 500 nanometers (nm), according to certain embodiments.

In order to further investigate the morphology and microstructure of the synthesized catalysts, transmission electron microscopy (TEM) was conducted. TEM images of the CuOH—Pt nanoparticles synthesized under identical conditions are presented in FIGS. 3A-3C. As shown in FIG. 3A, the Cu-based particles exhibit a spherical morphology with an average grain size of approximately 70 nm. Closer inspection reveals that each spheroidal particle is composed of finer sub-nanoparticles ranging from approximately 5 to 8 nm in diameter, forming a loosely packed, three-dimensional clustered structure. These aggregates are attributable to a chemically disordered face-centered cubic (fcc) phase of copper.

Figure 3B:
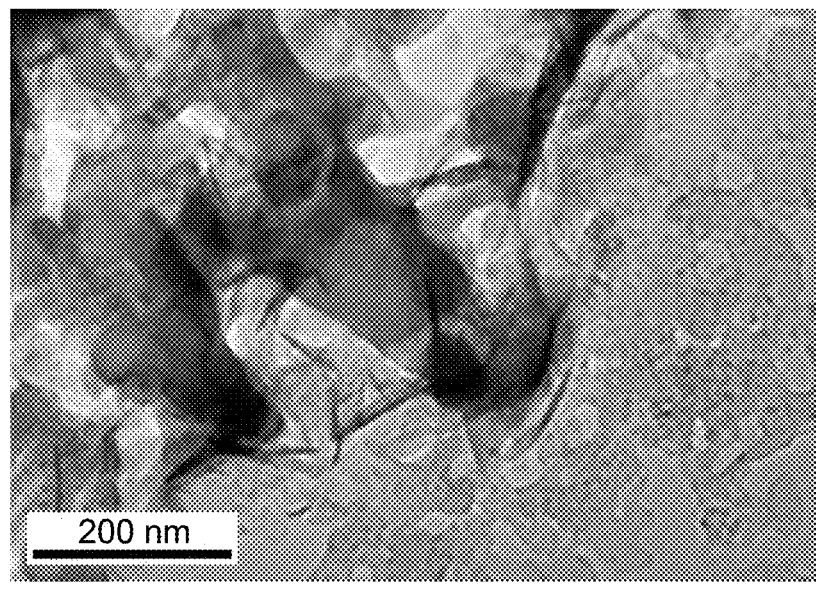
FIG. 3B depicts a TEM image of the CuOH—Pt catalyst at a magnification of 200 nm, according to certain embodiments.
Figure 3C:
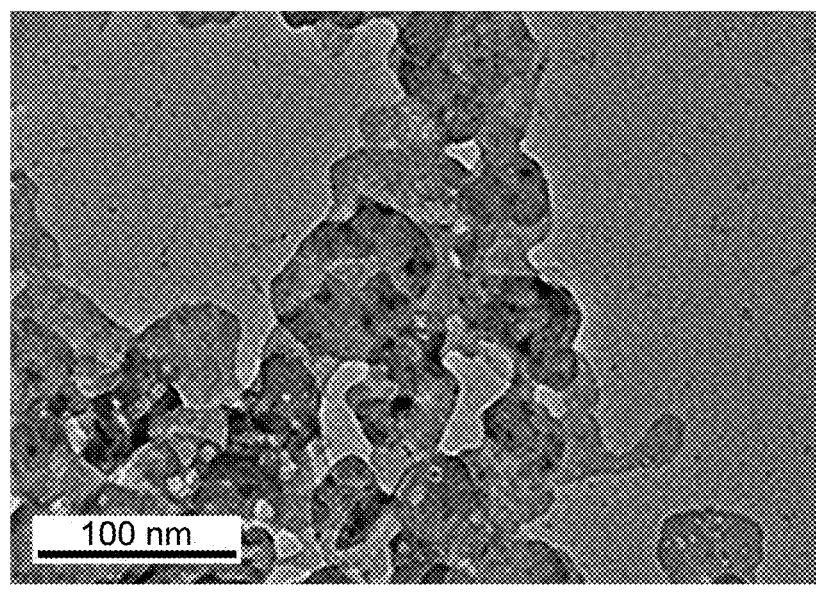
FIG. 3C illustrates a TEM image of the CuOH—Pt catalyst at a magnification of 100 nm, according to certain embodiments.

In FIGS. 3B-3C, smaller, darker contrast regions were observed within the CuOH matrix, which were identified as platinum nanoparticles. The features confirm the successful deposition and dispersion of Pt on the CuOH support. The uniform distribution of Pt nanoparticles across the matrix is a critical factor in maximizing the electrochemically active surface area of the catalyst.

Figure 3D:
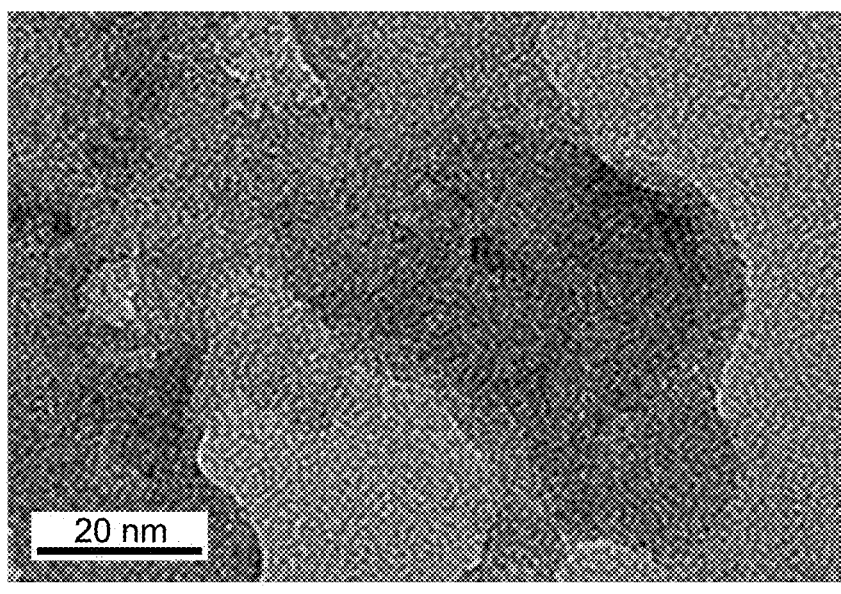
FIG. 3D illustrates a high-resolution transmission electron microscopy (HRTEM) image of the CuOH—Pt catalyst at a magnification of 20 $\mu$m, according to certain embodiments.
Figure 3E:
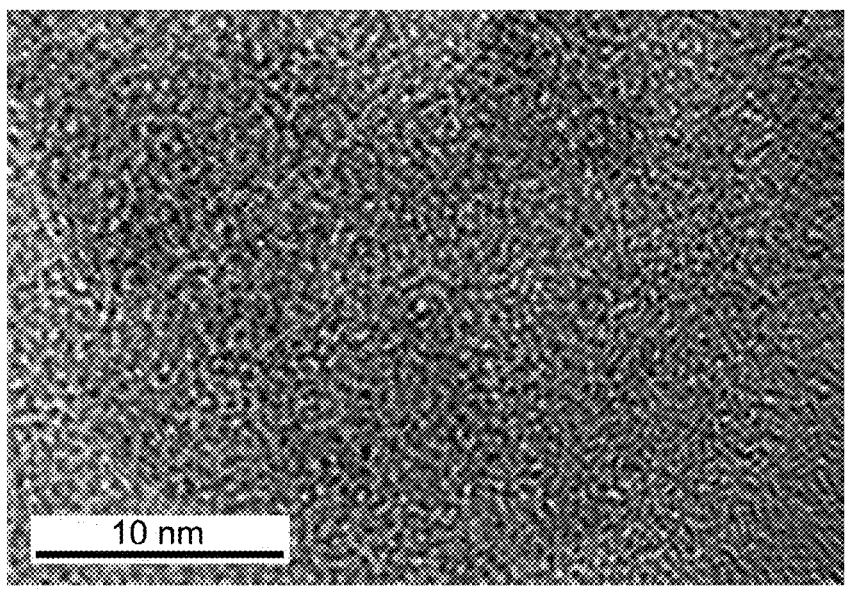
FIG. 3E depicts a HRTEM image of the CuOH—Pt catalyst at a magnification of 10 $\mu$m, according to certain embodiments.
Figure 3F:
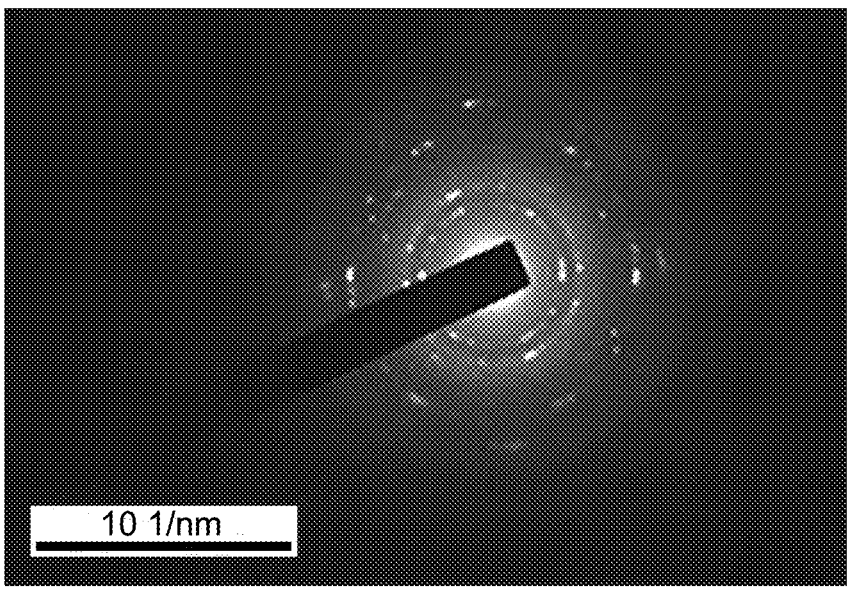
FIG. 3F illustrates a selected area electron diffraction (SAED) pattern of the CuOH—Pt catalyst, according to certain embodiments.

High-resolution transmission electron microscopy (HR-TEM) images, as shown in FIG. 3D-3E, displayed distinct atomic lattice fringes that reflect the crystalline nature of the catalyst. The measured interplanar lattice spacing is approximately 0.227 nm, consistent with the reported values for crystalline platinum [See: Zhu Y, Mao B, Zhang J, Liu Q, Li X, Song K. Pt|Cu *Bimetallic stratiform nanocrystal cluster hierarchical frameworks: robust catalyst for hydrolyzing ammonia borane to generate hydrogen Adv Mater Interfaces* 2022; 9, incorporated herein by reference in its entirety]. The presence of well-defined lattice fringes without evident distortion indicates high crystallinity and uniform incorporation of Pt into the CuOH framework. The platinum grains were observed to be extremely fine, with particle sizes ranging from 1 to 2 nm, and exhibited uniform dispersion throughout the support material.

Selected area electron diffraction (SAED) analysis, as illustrated in FIG. 3E, provides further crystallographic insight. The pattern consists of discrete diffraction rings corresponding to the crystallographic planes of both CuOH and Pt phases. The appearance of dotted rings confirms the polycrystalline nature of the catalyst and supports the presence of ultrafine copper nanocrystals embedded within the structure.

Figures 4, 5:
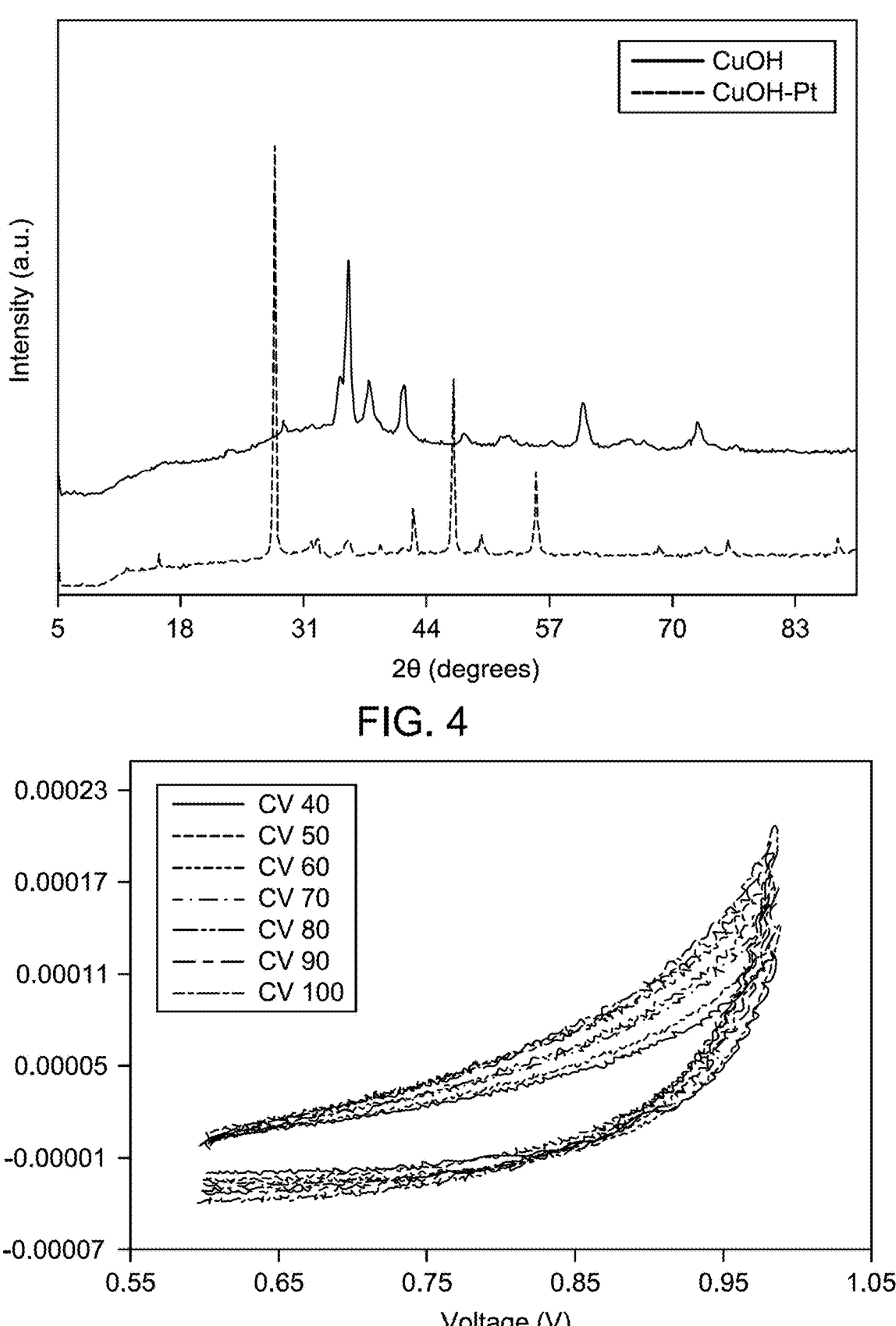
FIG. 4 illustrates X-ray diffraction (XRD) patterns of the CuOH and CuOH—Pt catalysts, according to certain embodiments.
FIG. 5 depicts cyclic voltammetry (CV) curves of the CuOH—Pt catalyst at different scan rates ranging from 40 millivolts per second (mV/s) to 90 mV/s, according to certain embodiments.

In order to further evaluate the composition and crystallographic structure of the synthesized samples, X-ray diffraction (XRD) analysis was performed. As illustrated in FIG. 4, the diffraction pattern represented in blue corresponds to the copper hydroxide (CuOH) phase. The observed peaks confirm the crystalline nature and nanoscale dimensions of the CuOH particles, as evidenced by line broadening in the diffraction profile. The position and relative intensities of the peaks align closely with the standard reference pattern for CuOH (JCPDS No. 35-0505). Specifically, the characteristic 2θ peaks observed at 16.56°, 23.64°, 33.98°, 35.78°, 37.98°, 39.56°, 53.06°, 54.10°, 62.86°, 63.52°, 67.26°, and 72.38° correspond to the (020), (021), (002), (111), (041), (130), (132), (061), (113), (200), (221), and (240) crystallographic planes of copper hydroxide, respectively [See: Awwad A M, Albiss B. *Biosynthesis of colloidal copper hydroxide nanowires using Pistachio leaf extract Adv Mater Lett* 2015; 6:51-4, incorporated herein by reference in its entirety incorporated herein by reference in its entirety]. In the pattern representing the CuOH—Pt sample, the appearance of additional diffraction peaks at 2θ of about 29.87°, 44.34°, 46.22°, and 81.45° was noted. The aforementioned reflections are assigned to the (111), (200), (220), and (311) planes of face-centered cubic (fcc) platinum, consistent with the standard reference pattern for metallic Pt (JCPDS No. 04-0802) [See: Jiang M, Zhu D, Zhao X. *Electrolysis of ammonia for hydrogen production catalyzed by Pt and Pt-Ir deposited on nickel foam, incorporated herein by reference in its entirety Journal of Energy Chemistry* 2014; 23:1-8 incorporated herein by reference in its entirety].

Notably, the diffraction peaks corresponding to CuOH remain visible in the CuOH—Pt pattern, indicating that the crystalline structure of the CuOH support is preserved following platinum incorporation. A slight shift and broadening of the CuOH peaks in the presence of Pt suggest an interaction between the dispersed platinum nanoparticles and the CuOH matrix.

The detection of crystalline Pt domains in conjunction with retained CuOH features confirms the successful deposition of Pt onto the support material using the described wet chemical synthesis method. The above provided structural evidence, in combination with the morphological insights obtained from transmission electron microscopy, supports the formation of a composite catalyst possessing the structural characteristics desirable for electrochemical ammonia oxidation and hydrogen evolution.

The electrochemical performance of the synthesized CuOH—Pt catalyst was evaluated using cyclic voltammetry (CV). The CV curves obtained at varying scan rates are shown in FIG. 5. The electrochemical tests were conducted in a 0.5 M KOH aqueous electrolyte (analytical grade), using a platinum working electrode onto which the synthesized nanoparticles were drop-cast. The specific capacitance and energy density of the catalyst were calculated using standard formulas as defined in Equation 3 and Equation 4.

$$C_s = \frac{\int_J I}{mS(V_2 - V_1)} \tag{3}$$

$$E\left(\frac{Wh}{Kg}\right) = \frac{1}{2} * \frac{1000}{3600} * C_s V^2 \tag{4}$$

where 'Cs' is the specific capacitance, 'S' is the voltage scan rate, 'm' is the mass of the electrode materials, $(V_2-V_1)$ is the potential window, 'I' is the integrated current area, 'E' is the energy density, and 'V' is the potential window.

Further investigation into the supercapacitive characteristics of the catalyst was carried out using CV in a 6 M KOH electrolyte. Cyclic voltammograms were recorded at scan rates ranging from 40 mV·s$^{-1}$ to 100 mV·s$^{-1}$ over a potential window of 0 V to 0.5 V versus the saturated calomel electrode (SCE). The use of 6 M KOH was selected based on prior research demonstrating enhanced specific capacitance at higher electrolyte concentrations, with 6 M representing the upper concentration limit for stable operation [See: Wang G, Huang J, Chen S, Gao Y, Cao D. *Preparation and supercapacitance of CuO nanosheet arrays grown on nickel foam incorporated herein by reference in its entirety J Power Sources* 2011; 196:5756-60, incorporated herein by reference in its entirety].

As the scan rate increased from 40 mV·s$^{-1}$ to 100 mV·s$^{-1}$, a corresponding increase in the current response was observed, consistent with ideal capacitive behaviour. The voltametric current exhibited a direct proportionality to scan rate, indicating efficient charge transport within the electrode material. In addition, with increasing scan rate, the anodic peaks shifted toward more positive potentials, while the cathodic peaks shifted toward more negative values. The aforementioned shift is attributed to an increased internal resistance of the electrode at higher scan rates. The cyclic voltammograms exhibited consistent symmetry and maintained a general shape across all scan rates, indicative of a reversible redox process occurring on the surface of the catalyst. The minimal deviation in voltametric profile at higher scan rates reflects the favourable conductivity and structural stability of the CuOH—Pt system. The described electrochemical characteristics suggest a high electrochemical surface area (ECSA), which provides rapid electron transfer and supports efficient ammonia oxidation and hydrogen evolution.

The observed uniformity in CV response, along with subtle peak shifts, further implies homogeneous dispersion of platinum nanoparticles on the CuOH support and effective interfacial interaction between the two components. The combination of stable redox behaviour, capacitive response, and electrochemical integrity underscores the potential utility of the CuOH—Pt catalyst for energy-related electrochemical applications, particularly in ammonia electrolysis and hydrogen generation.

In order to investigate the charge transfer characteristics at the electrode-electrolyte interface, electrochemical impedance spectroscopy (EIS) measurements were performed prior to electrochemical cycling. The impedance data were collected over a frequency range of 1 MHz to 1 Hz. The resulting EIS spectra were analysed using a Nyquist plot, which enables the evaluation of key electrochemical parameters including charge transfer resistance, double-layer capacitance, and overall electrode kinetics.

Figures 6A, 6B:
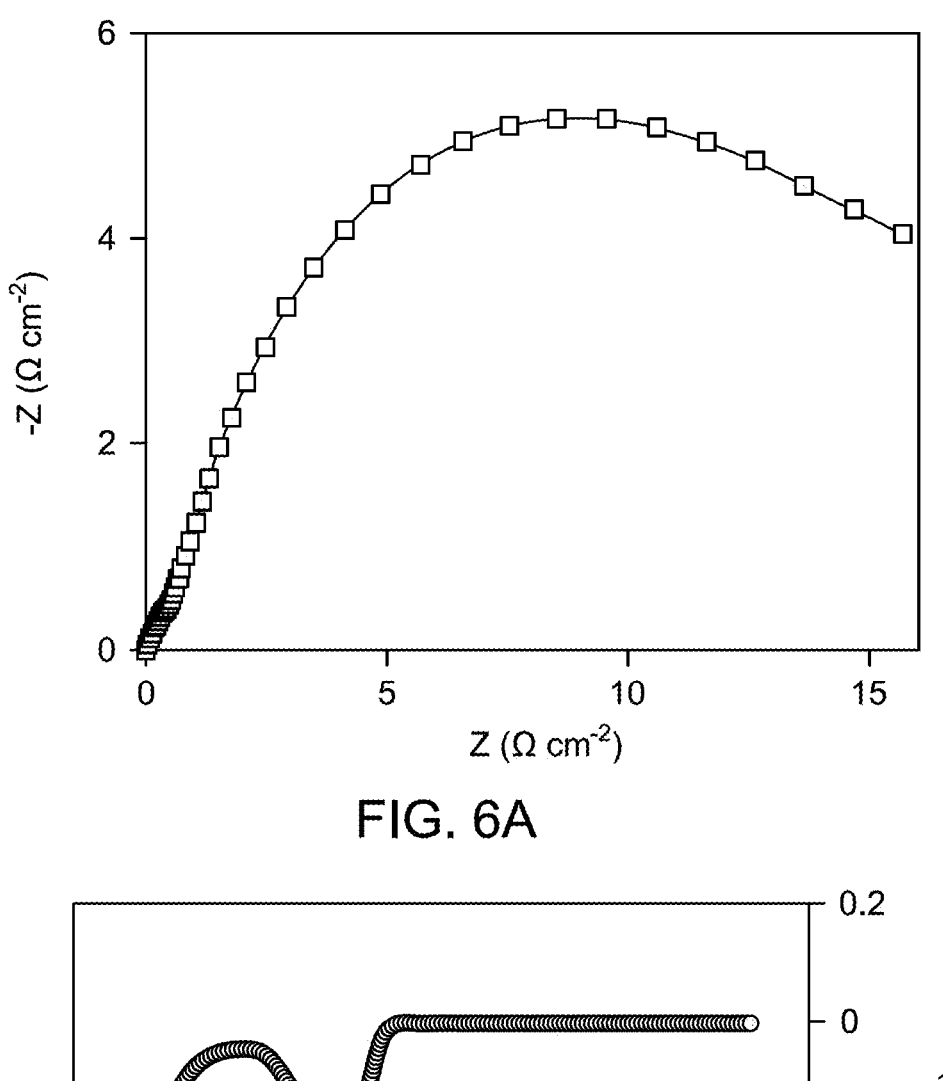
FIG. 6A illustrates electrochemical impedance spectra (EIS) for the CuOH—Pt catalyst, according to certain embodiments.
FIG. 6B depicts cyclic voltammograms (CV) of the CuOH—Pt catalyst recorded at a scan rate of 10 mV/s, according to certain embodiments.

In a typical Nyquist representation, the real component of impedance (Z') is plotted against the imaginary component (Z"), providing interpretation of both high-frequency and low-frequency processes. As illustrated in FIG. 6A, the impedance spectrum for the CuOH—Pt catalyst consists of a semicircular arc in the high-frequency region, followed by a linear segment (Warburg region) in the low-frequency range [See: Romero B, del Pozo G, Arredondo Conchillo B, Martín-Martín D, Hernández-Balaguera E, López-González M del C. *Characterization of organic and perovskite solar cells by impedance spectroscopy, SPIE-Intl Soc Optical Eng;* 2019, p. 22 incorporated herein by reference in its entirety]. The presence of the semicircle indicates charge transfer resistance at the electrode interface, while the low-frequency tail is associated with ion diffusion within the electrolyte and porous electrode structure.

In addition to evaluating electrochemical energy storage properties, the CuOH—Pt electrodes were examined for electrochemical energy conversion capabilities thereof. As such, cyclic voltammetry (CV) measurements were conducted to assess a behaviour of CuOH—Pt electrodes as electrocatalysts. The corresponding voltammograms, shown in FIG. 6B, reflect the electrochemical activity of the material under relevant conditions. The obtained results extend the applicability of the CuOH—Pt catalyst beyond energy storage to potential use in electrochemical energy conversion systems.

Figure 7:
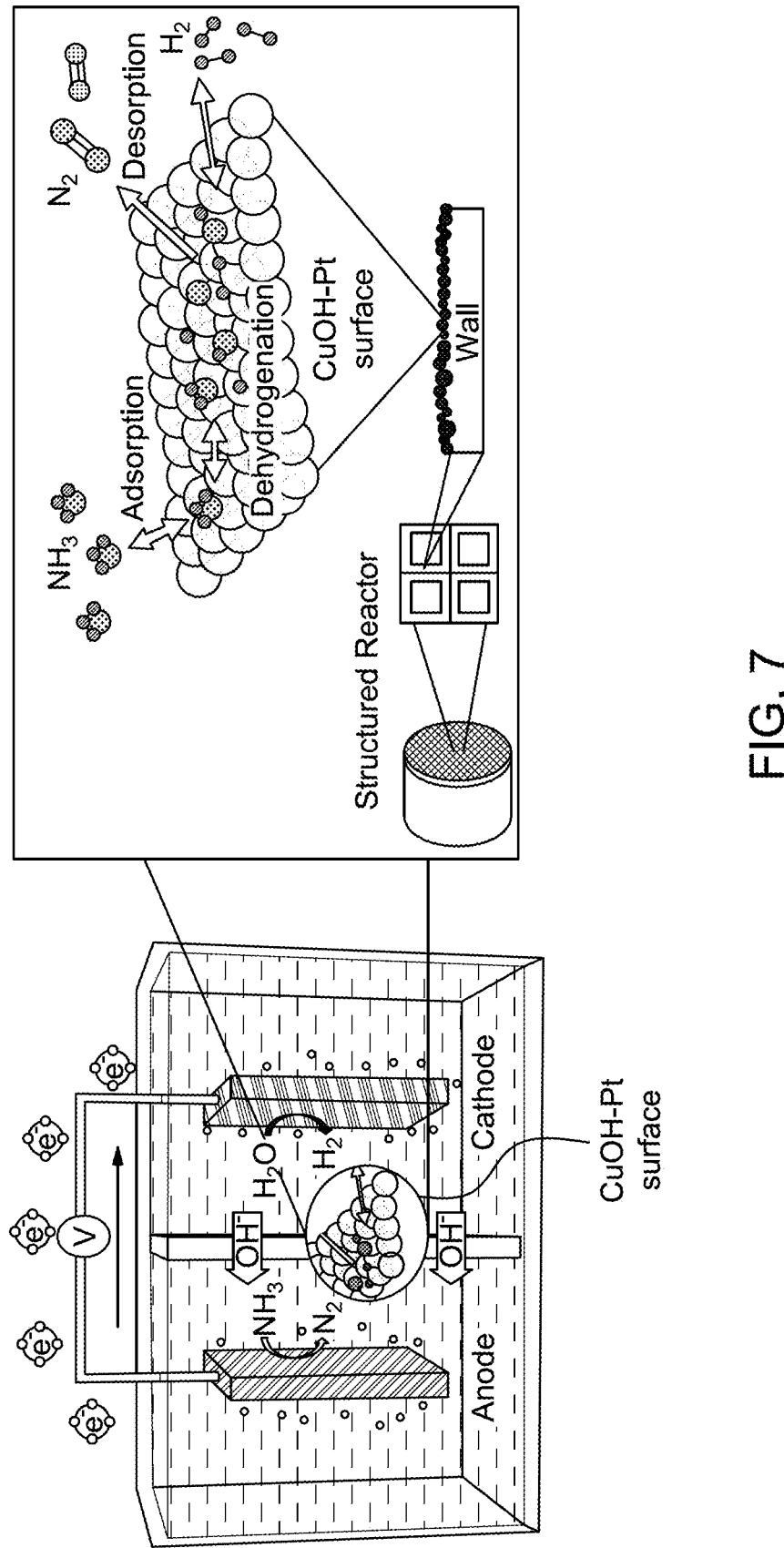
FIG. 7 illustrates a schematic diagram of an electrochemical cell used for ammonia electrolysis employing the CuOH—Pt catalyst, according to certain embodiments.

Ammonia electrolysis has emerged as a viable method for sustainable hydrogen production due to a lower thermodynamic energy requirement relative to water electrolysis. The lower energy demand is attributed to the reduced energy necessary to cleave the N—H bonds in ammonia molecules. The electrochemical mechanism of ammonia electrolysis using a CuOH—Pt catalyst involves two half-cell reactions, the anodic ammonia oxidation reaction (AOR) and the cathodic hydrogen evolution reaction (HER). A schematic representation of the electrochemical cell configuration employed for this process is presented in FIG. 7.

Under alkaline conditions, ammonia (NH$_3$) undergoes oxidation by hydroxide ions (OH$^-$), serving as the oxidant. The oxidation initiates the ammonia oxidation reaction. Based on thermodynamic considerations, the overall cell potential for ammonia electrolysis is approximately 0.059 V, resulting in a theoretical energy consumption of 1.55 kWh per kilogram of hydrogen gas (H$_2$). The energy consumption value represents a significant reduction of about approximately 95% compared to the theoretical energy requirement for water electrolysis, which is approximately 33 kWh per kilogram of $H_2$.

The CuOH—Pt catalyst plays a critical role in improving the efficiency of the anodic ammonia oxidation process. At the anode, in a first step, ammonia molecules are adsorbed onto the surface of the CuOH—Pt catalyst. The CuOH phase enhances the affinity of the catalyst for $NH_3$ and promotes adsorption, while the platinum (Pt) phase provides catalytically active sites that facilitate subsequent redox reactions.

In a second step, the adsorbed $NH_3$ species undergo stepwise dehydrogenation to yield nitrogen-containing intermediates, along with the release of electrons and hydrogen ions (protons). In a third step, nitrogen atoms generated through dehydrogenation combine on the catalyst surface to form nitrogen gas ($N_2$), which is released at the anode. Concurrently, the hydrogen ions generated during AOR migrate through the electrolyte and participate in the cathodic hydrogen evolution reaction. At the cathode, these protons are reduced to form molecular hydrogen ($H_2$). The platinum component of the catalyst is particularly effective in facilitating the recombination of adsorbed hydrogen atoms to generate gaseous $H_2$.

The above-described multistep mechanism underscores the synergistic function of the CuOH—Pt catalyst, where CuOH promotes selective adsorption of ammonia, and Pt enhances both oxidation and reduction kinetics, contributing to the catalyst's electrochemical efficacy in ammonia electrolysis systems. The CuOH component of the catalyst enhances the adsorption of ammonia ($NH_3$) molecules and contributes to the stabilization of nitrogen-containing reaction intermediates. The said effect serves to lower the activation energy barriers associated with successive oxidation steps in the AOR. The Pt component simultaneously facilitates catalytic activity at both electrodes, promoting the oxidation of ammonia at the anode and supporting the hydrogen evolution reaction (HER) at the cathode. The combined functionality of the CuOH—Pt system results in improved reaction efficiency and selectivity. The interaction between the hydroxide and metallic phases contributes to reduced overall energy consumption during hydrogen production via ammonia electrolysis. As a result, the CuOH—Pt catalyst supports an energy-efficient electrochemical process, reinforcing the viability of ammonia electrolysis as a sustainable method for hydrogen generation.

The aspects of the present disclosure relate to the method of producing hydrogen by an electrochemical ammonia oxidation reaction. In particular, the present disclosure addresses existing constraints by integrating a CuOH support with platinum to form a structurally stable catalyst, as confirmed through SEM, TEM, HRTEM, and XRD analyses. The electrochemical evaluation, including cyclic voltammetry and impedance spectroscopy, demonstrates favorable charge transfer behavior and lower overpotentials for ammonia oxidation. The combined structural and electrochemical attributes suggest that the CuOH—Pt system supports efficient ammonia electrolysis while reducing reliance on high loadings of noble metals. The foregoing characteristics contribute to improved cost-performance metrics and highlight the potential of such materials for scalable hydrogen generation via ammonia-based electrochemical systems.

Numerous modifications and variations of the present disclosure are possible in light of the above teachings. It is therefore to be understood that within the scope of the appended claims, the invention may be practiced otherwise than as specifically described herein.

The invention claimed is:

1. A method of producing hydrogen by an electrochemical ammonia oxidation reaction, comprising:
   A. making an anode by a process comprising the following steps performed under an inert atmosphere;
      1. Dissolving copper (II) chloride ($CuCl_2$) and polyvinylpyrrolidone (PVP) in water to form a first mixture;
      2. Adding ascorbic acid to the first mixture to form a second mixture and allowing the reduction reaction to proceed to completion;
      3. Adding sodium borohydride ($NaBH_4$) to the second mixture under agitation at a temperature of about 30° C. to about 90° C. to form a third mixture and produce a solid;
      4. Separating the solid from the third mixture to provide copper nanoparticles;
      5. Forming a 1 wt. % platinum (Pt) solution derived from a $PtCl_3$ precursor in 0.5M NaOH and combining it with the solid from the third mixture to form a fourth mixture and agitating the fourth mixture at a temperature of from 10° C. to 80° C. for a duration of from 1 to 10 hours to produce an anodic material;
      6. Separating the anodic material from the fourth mixture and forming the anode;
      wherein the anode comprises:
         a. from 98.0 wt. % to 99.5 wt. % of a polycrystalline matrix comprising copper hydroxide (CuOH), the polycrystalline matrix further comprising:
            i. substantially spherical aggregates of nanoparticles of the copper hydroxide, having a mean grain size as determined by High Resolution Transmission Electron Microscopy, of from 50 nm to 100 nm; and
            ii. Substantially spherical aggregates of elemental copper (Cu) nanoparticles, wherein a fraction of the elemental copper (Cu) nanoparticles have a particle size less than about 10 nm, as determined by High Resolution Transmission Electron Microscopy; and
         b. from 0.5 wt. % to 2.0 wt. % of nanoparticles of crystalline platinum (Pt) having a mean grain size, as determined by High Resolution Transmission Electron Microscopy, of from 0.5 nm to 5 nm; wherein the nanoparticles of crystalline Pt are uniformly dispersed in the polycrystalline matrix comprising copper hydroxide;
   B. disposing the anode and a cathode in an aqueous electrolyte solution comprising dissolved ammonia and potassium hydroxide; and
   C. applying a potential difference between the anode and the cathode to produce hydrogen by the electrochemical ammonia oxidation reaction.

2. The method of claim 1, wherein the polycrystalline matrix further comprises single atom Pt.

3. The method of claim 1, wherein the anode has a sheet resistance of greater than 15 $\Omega cm^{-2}$, as determined by electrochemical impedance spectroscopy.

\* \* \* \* \*